US005416296A

United States Patent [19]

Walters

[11] Patent Number: 5,416,296

[45] Date of Patent: May 16, 1995

[54] ELECTRODE FOR PLASMA ARC TORCH

[75] Inventor: Jeffrey Walters, Bradenton, Fla.

[73] Assignee: American Torch Tip Company, Brandenton, Fla.

[21] Appl. No.: 209,974

[22] Filed: Mar. 11, 1994

[51] Int. Cl.$^6$ .............................................. B23K 10/00

[52] U.S. Cl. ............................ 217/121.5; 219/121.52; 219/121.49; 219/119

[58] Field of Search ...................... 219/121.52, 121.49, 219/121.5, 121.48, 75, 119, 74

[56] References Cited

U.S. PATENT DOCUMENTS

| | | | |
|---|---|---|---|
| 2,906,858 | 9/1959 | Morton, Jr. | 219/121 |
| 3,450,926 | 6/1969 | Kiernan | 219/121.52 |
| 3,534,388 | 10/1970 | Ito et al. | 219/121 |
| 3,619,549 | 11/1971 | Hogan | 219/121 |
| 3,641,308 | 2/1972 | Couch, Jr. et al. | 219/121 |
| 3,825,718 | 7/1974 | Mosiashvili et al. | 219/121 |
| 4,133,987 | 1/1979 | Lakomsky et al. | 219/121.49 |
| 4,311,897 | 1/1982 | Yerushalmy | 219/121 |
| 4,769,524 | 9/1988 | Hardwick | 219/121.52 |
| 4,777,343 | 10/1988 | Goodwin | 219/121 |
| 4,864,097 | 9/1989 | Wallner | 219/121.52 |
| 4,958,057 | 9/1990 | Shiraishi et al. | 219/121.5 |
| 5,097,111 | 3/1992 | Severance, Jr. | 219/121.52 |
| 5,208,448 | 5/1993 | Everett | 219/121.48 |

FOREIGN PATENT DOCUMENTS

| | | |
|---|---|---|
| 1125385 | 6/1982 | Canada . |
| 1520000 | 8/1978 | United Kingdom . |

*Primary Examiner*—Mark H. Paschall

*Attorney, Agent, or Firm*—Sughrue, Mion, Zinn, Macpeak & Seas

[57] ABSTRACT

An electrode assembly having a tubular body portion is positioned in the head of a plasma arc torch and supports an electrode element spaced from a nozzle by an arc chamber. A gas is ionized in the arc chamber when an electric arc is initiated between the electrode element and the nozzle. The electrode element is retained in a post extending up from the bottom wall of the electrode body portion. The post has an extended exterior surface to increase the surface area in contact with coolant that circulates downwardly through the electrode body portion into surrounding relation with the post. The extended surface area of the post promotes heat transfer from the electrode element to the coolant and extends the operational life of the electrode element.

17 Claims, 3 Drawing Sheets

FIG. 1
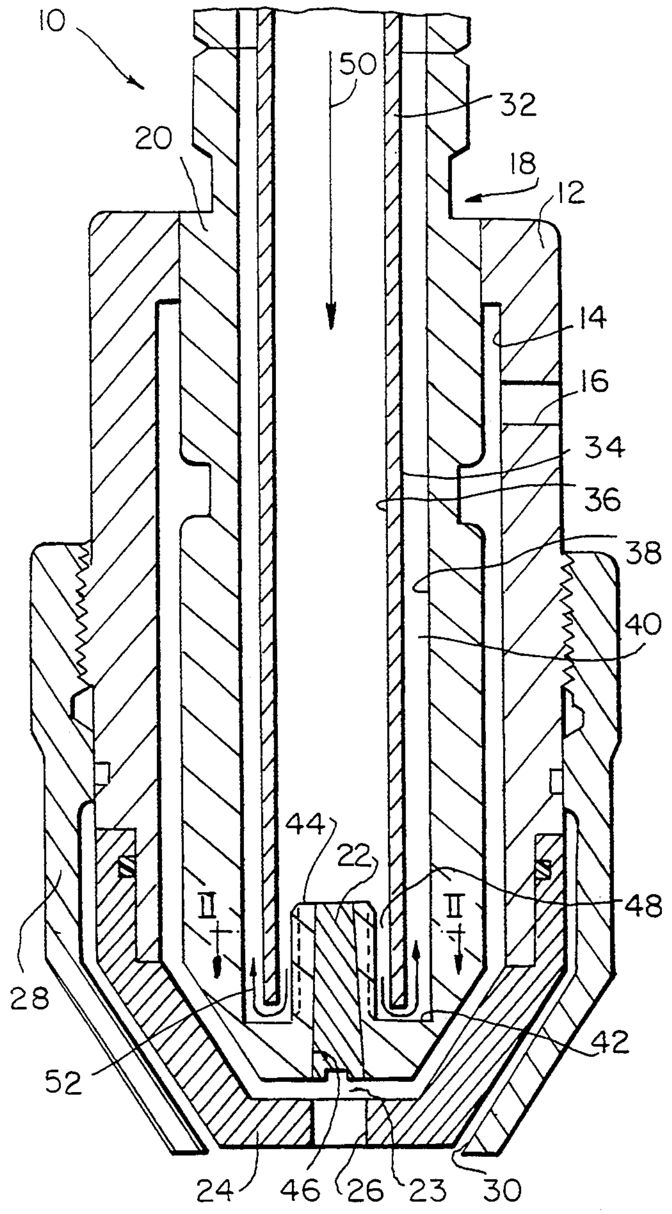
FIG. 3
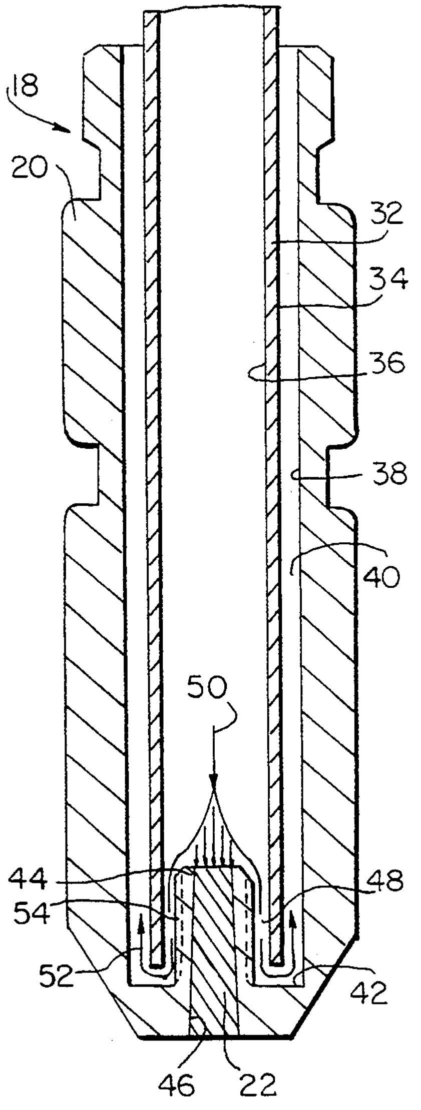
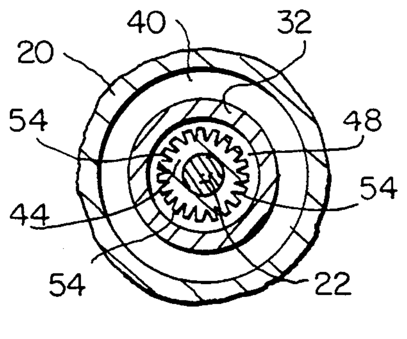
FIG. 2

ELECTRODE FOR PLASMA ARC TORCH

BACKGROUND OF THE INVENTION

1. Field of the Invention

This invention relates to an improved electrode for a plasma arc torch and, more particularly, to method and apparatus for cooling the electrode element to extend its operational life.

2. Description of the Prior Art

In a plasma arc torch, a plasma arc is developed by passing an electric arc through a constricting passageway of a nozzle located between an electrode and the workpiece. A gas is directed through the nozzle and the electric arc heats the gas to an ionization temperature. A plasma arc is emitted as a jet from the nozzle to the workpiece. The plasma arc is formed at temperatures that range from 6,000° F. and higher. A plasma arc at this temperature is useful for cutting and welding ferrous and non-ferrous metals.

The electrode includes an electrically conductive casing or body portion, preferably of copper, having a generally tubular configuration with an internal bore. At the extreme lower end of the electrode tubular body portion is retained an electrode element fabricated of a high electron emitting refractory material, such as tungsten, hafnium, zirconium, or alloys thereof. The electrode element is frictionally retained to extend to the end of the body portion of the electrode into the arc chamber oppositely of the nozzle. The electrode element serves as the cathode and the nozzle serves as the anode in the electric circuit. With gas flowing into the arc chamber, the initiation of an arc between the electrode element and the nozzle heats the gas to its ionization temperature.

The extreme heat generated by the plasma arc rapidly wears the electrode element and the surrounding electrode body portion requiring that the entire electrode assembly be replaced after relatively few pierces per inch of cut into the metal. A number of measures have been taken to extend the life of an electrode by controlling the current to the electrode, controlling the orifice size of the nozzle, and changing the composition of the gas and the flow rate of the gas. Also, it is well known to circulate coolant in heat transfer relationship with the electrode element.

U.S. Pat. No. 3,450,926 discloses an electrode assembly in which the copper casing surrounding the tungsten electrode element is threaded to increase the surface area of the casing in contact with the gas stream flowing to the nozzle. The threaded surface area promotes the transfer of heat from the tungsten electrode element through the copper casing to the gas. In this manner, the gas is preheated and the electrode element is cooled to promote the life of the electrode.

U.S. Pat. No. 3,450,926 also discloses a tube that extends concentrically within the tubular electrode body portion. Water circulates through the interior of the electrode body portion into contact with the electrode element and out the tube. Circulating coolant further serves to transfer heat away from the electrode element.

The use of a coolant, liquid or gas, circulating through the interior of an electrode body portion to transfer heat from the electrode element is disclosed in U.S. Pat. Nos. 2,906,858; 3,534,388; 3,619,549; 3,825,718; and 4,769,524.

One factor to consider in utilizing a liquid coolant for an electrode assembly is preventing the liquid from reaching its boiling point. For example, as disclosed in U.S. Pat. Nos. 3,641,308 and 4,777,343, the coolant flowing through the inner tube within the electrode assembly flows in direct contact with the electrode element so that the heat is directly transferred from the element to the coolant. There is no dissipation of heat through the body portion of the electrode holder before it contacts the coolant.

It has been proposed to provide a heat transfer path between the coolant circulating through the electrode assembly and the electrode element. U.S. Pat. No. 4,311,897 and Canadian Patent No. 1,125,385 disclose electrode assemblies having inner cooling tubes in which the electrode element is separated by a heat transfer path in the body of the electrode from the liquid circulating through the tubular electrode body. With this arrangement, the bottom wall of the interior chamber of the electrode body is spaced by a mass of metal from the electrode element. By controlling the distance the electrode element is spaced from the bottom wall the rate of heat transfer from the insert to the coolant is controlled.

U.S. Pat. No. 5,208,448 and U.K. Patent No. 1,520,000 disclose another arrangement for the flow of coolant within the electrode assembly by extending a post upwardly from the bottom wall of the assembly. The electrode element extends into the post above the bottom wall. The coolant circulates around the post and increases the heat transfer efficiency from the electrode element through the post to the coolant.

While it has been proposed to extend the life of an electrode assembly in a plasma arc torch by circulating coolant through the interior of the electrode body in direct contact with the electrode element or in contact with heat transfer path to the insert, the known devices have limited heat transfer efficiency between the coolant and the electrode element. Therefore, there is need for an electrode assembly that promotes efficient transfer of heat from the electrode element to the coolant.

SUMMARY OF THE INVENTION

In accordance with the present invention there is provided an electrode assembly for a plasma arc torch that includes an electrode holder having a tubular body portion with an exterior surface and an interior surface. The interior surface has an open upper end portion and a closed lower end portion forming a bottom wall. The interior surface is exposed to a coolant flowing between the open upper end portion and the closed lower end portion. A post projects upwardly from the bottom wall concentrically within the tubular body portion. The post has an outer surface forming an annulus between the tubular body portion interior surface and the post adjacent to the bottom wall. The post has a bore with an opening extending through the exterior surface. An electrode element is retained in the post bore. The electrode element has an arc initiating end portion positioned in the opening in the tubular body exterior surface. The post has a configuration that provides an outer surface area greater than the surface area of a cylinder having the same outer dimension to thereby increase the area of contact of the coolant with the surface of the post to increase the rate of heat transfer from the electrode through the post to the coolant.

Further in accordance with the present invention there is provided a method for cooling an electrode assembly of a plasma arc torch comprising the steps of providing an electrode holder with a tubular body portion having an interior surface with an open upper end portion and a closed bottom wall. A coolant is circulated in contact with the interior surface of the electrode holder. A post extends upwardly from the bottom wall into the interior of the electrode holder. An annulus is formed around the post between the interior surface of the electrode holder and the exterior surface of the post. An electrode element is retained within a bore of the post. The end of the electrode element is positioned at the exterior surface of the electrode holder opposite the bottom wall to initiate an electric arc. The configuration of the exterior surface of the post is non-cylindrical so that the exterior surface area is greater than an exterior smooth cylindrical surface having the same outer diameter. This increased surface area in the same space promotes the transfer of heat from the electrode element to the coolant.

Accordingly, a principal object of the present invention is to provide method and apparatus for extending the operational life of a plasma arc torch electrode.

Another object of the present invention is to provide in a plasma arc torch an electrode element retained in a holder that improves the cooling of the electrode element by transfer of heat from the electrode element to a coolant circulating through the electrode holder.

A further object of the present invention is to retain an electrode element within a post extending into the interior surface of an electrode holder where the surface of the post is machined to increase the heat transfer surface area and thereby increase the transfer of heat from the electrode to a coolant circulating around the post.

These and other objects of the present invention will be more completely disclosed and discussed in the following specification, the accompanying drawings and the appended claims.

BRIEF DESCRIPTION OF THE DRAWINGS

FIG. 1 is a fragmentary sectional view in side elevation of the end of a plasma arc torch, illustrating an electrode assembly in accordance with the present invention.

FIG. 2 is a sectional view of the electrode assembly taken along line II—II of FIG. 1, illustrating an extended surface on the exterior of a post in which an electrode element is retained.

FIG. 3 is a fragmentary sectional view in side elevation of the electrode assembly shown in FIG. 1, illustrating the electrode element retained in the post of the holder.

DESCRIPTION OF THE PREFERRED EMBODIMENTS

Figure 4:
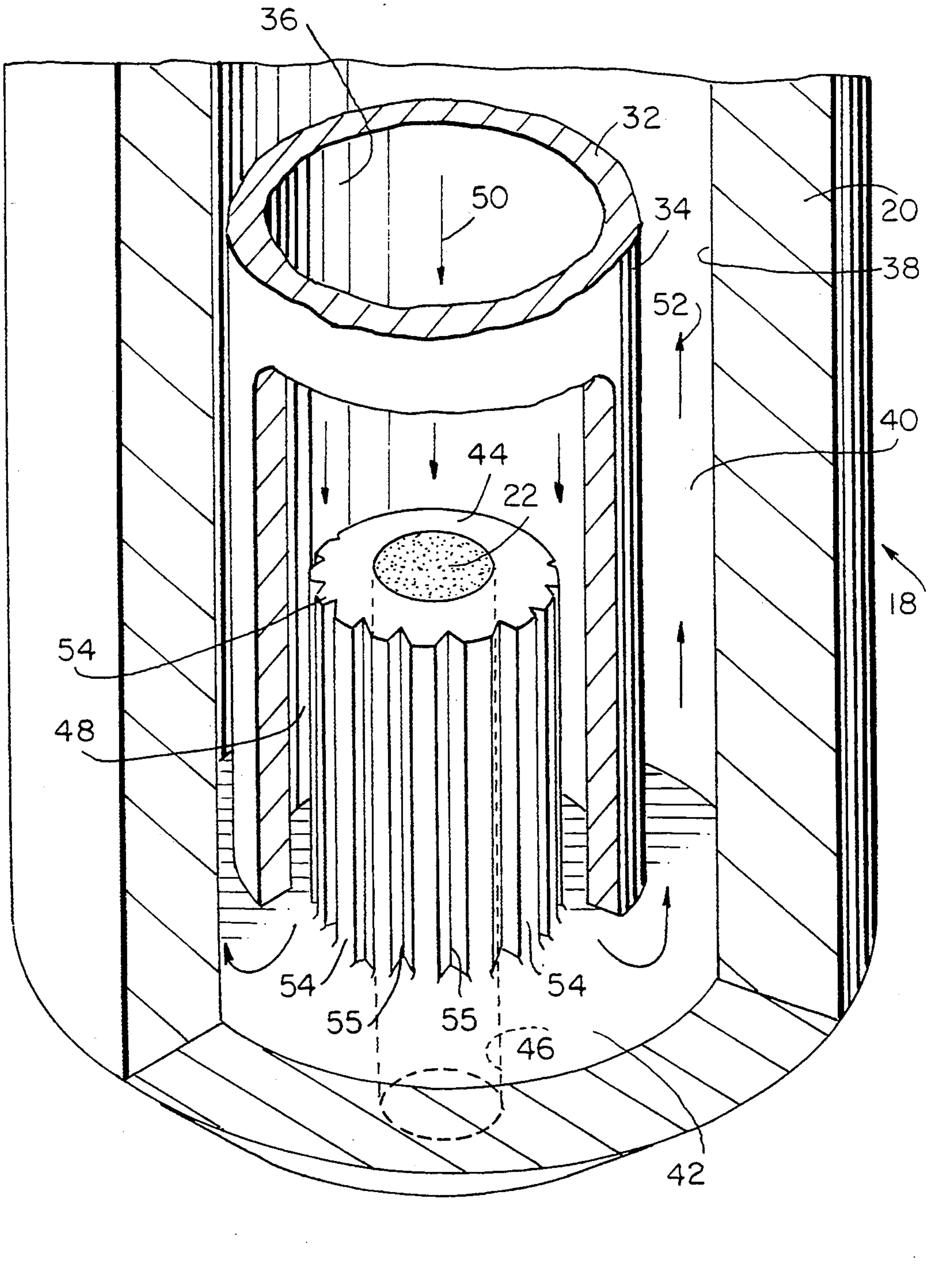
FIG. 4 is an enlarged fragmentary isometric view, partially in section, of the electrode assembly, illustrating a fluted exterior surface on the post.

Referring to the drawings and particularly to FIGS. 1 and 2, there is illustrated the end of a plasma arc torch generally designated by the numeral 10 for cutting and welding metal. The plasma arc torch 10 includes a body portion 12 having a cylindrical wall forming a passageway 14 with an inlet 16 extending into the passageway 14. The inlet 16 is connected to a gas source, such as oxygen or a mixture of argon, nitrogen, hydrogen and other suitable gases, for generating an ionized plasma arc. Positioned within the body portion 12 is an electrode assembly generally designated by the numeral 18 having a tubular body portion 20 of copper that serves as a holder for an electrode element 22 formed of a high electron emitting refractory metal, such as tungsten, hafnium, zirconium or alloys thereof.

The torch body portion 12 concentrically surrounds the electrode assembly 18. The passageway 14 extends downwardly between the body portion 12 and the electrode assembly 18 to direct the gas from inlet 16 to the end of the electrode assembly 18 into contact with the electrode element 22.

A nozzle 24 is removably connected to the lower end of the body portion 12. The nozzle 24 has a conical configuration with an orifice 26 that is axially aligned with and spaced from the electrode element 22. The electrode element 22 is spaced from the nozzle 24 by a plasma chamber 23. Gas from the inlet 16 flows through passageway 14 into the chamber 23 between the electrode element 22 and the nozzle 24.

As well known in the art, the electrode assembly 18 is connected to the negative terminal of a DC power source and serves as the cathode; while, the nozzle 24 is connected to the positive terminal of the voltage source and serves as the anode. A shield cup 28 is threadedly connected to the body portion 12 in surrounding relation with the nozzle 24 and includes a central opening 30 through which the tip of the nozzle 24 extends. With this arrangement, the shield cup 28 may be disconnected from the body portion 12 so that the electrode assembly 18 and the nozzle 24 may be easily assembled or disassembled on the plasma arc torch 10.

To initiate an electric arc, current passes through the electrode assembly 18 to the electrode element 22. An electric arc extends from the electrode element 22 to the nozzle 24 in the chamber 23. With gas flowing through the chamber 23, once the electric arc is initiated the gas in the chamber 23 is heated to an ionization temperature and a plasma arc or jet is emitted at high velocity through the nozzle orifice 26 from the plasma arc torch 10. When the plasma arc is brought in contact with a workpiece, which is also known as piercing the workpiece, the plasma arc is transferred to the workpiece to complete the electric circuit between the electrode element 22 and the workpiece to cut the workpiece.

The temperature of the plasma arc may range from 6,000° to 100,000° F. resulting in rapid deterioration of the electrode body 20 and the electrode element 22. When the electrode element 22 deteriorates to the extent it can no longer sustain an electric arc, the electrode assembly 18 must be replaced in the plasma arc torch 10. Therefore, by cooling the electrode body portion 20 and the element 22, the life of the electrode assembly 18 can be prolonged.

In accordance with the present invention, cooling of the electrode assembly 18 is accomplished by positioning a cooling tube 32 concentrically within the electrode body portion 20. The tube 32 has an outer cylindrical surface 34 and an inner cylindrical surface 36 defining a wall therebetween. The tube 32 has a diameter which is less than the internal diameter of the electrode body portion 20 so that a passageway 40 is formed between the tube outer surface 34 and the electrode body portion internal surface 38. The tube 32 extends to a lower end portion within the electrode body portion 20 above a bottom wall 42.

Extending upwardly from the electrode body portion bottom wall 42 is a post 44 having an internal bore 46 extending along the longitudinal axis of the post 44. The post receives and frictionally retains therein the electrode element 22. The electrode element 22 can extend the entire length of the post as shown in FIGS. 1, 3 and 4 or partially into the post, as shown in FIG. 5, where it is spaced from the upper end portion of the post 44.

The post 44 is concentrically positioned within the electrode body portion 20 and surrounded by the tube 32. The post 44 is spaced from the tube inner surface 36 to form an annulus 48 therebetween. With this arrangement, coolant such as gas or water is directed downwardly within the cooling tube 32 in the direction of arrow 50, as shown in FIGS. 1, 3, and 4, into contact with the post 44 and into the annulus 48 around the post 44. The coolant flows downwardly in contact with the surface of the post 44 to the bottom wall 42 where the coolant flow is then diverted around the lower end of the tube 32 and upwardly through the passageway 40 around the tube 32 in the direction of arrow 52.

With the electrode element 22 frictionally retained in the post 44, heat is transferred from the electrode element 22 through the body of the post 44 to the coolant. It is believed the coolant circulates continuously through the tube 32 and the electrode body portion 20 in intimate contact with the exterior surface of the post 44 to transfer the heat from the electrode element 22 through the post 44 to the coolant without raising the temperature of a liquid coolant beyond its boiling point and reduces the thermal stresses on the electrode element 22 and extend the operational life of the electrode assembly 18.

Figure 5:
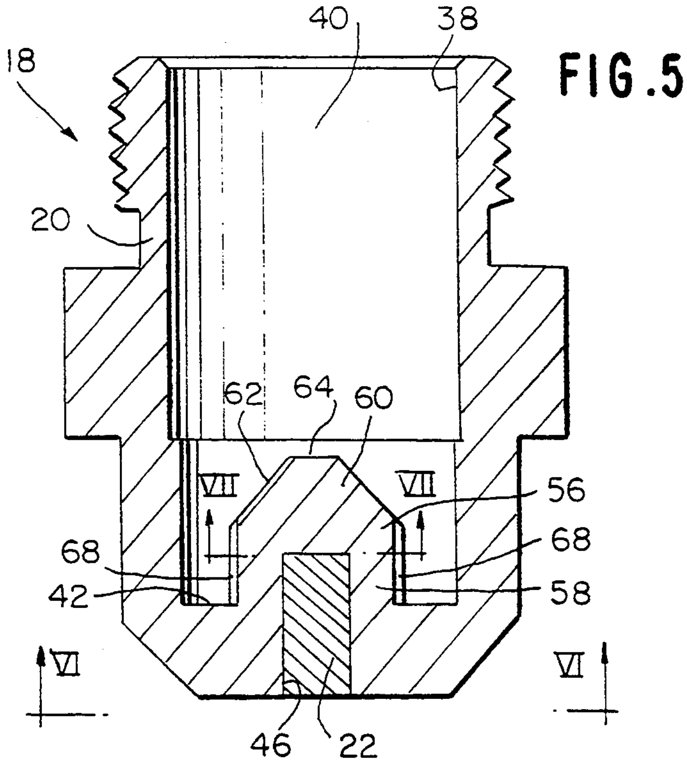
FIG. 5 is a sectional view in side elevation of another embodiment of an electrode for a plasma arc torch, illustrating an electrode element retained in a post having a fluted exterior surface and a frusto-conical end portion.

Now referring to FIGS. 2 and 4, there is illustrated in detail the structure of the post 44 that promotes the transfer of heat from the electrode element 22 to the coolant circulating on the surface of the post 44. The post 44 has an outer surface area greater than the outer surface area of a cylinder. In other words, the outer surface of the post 44 is increased, as by machining to increase the surface area of the post 44 in heat transfer relationship with the coolant.

In one embodiment as shown in FIG. 4, the exterior surface of the post 44 is machined by either surface broaching or milling to form a plurality of spaced apart, longitudinally extending flutes or protrusions 54 on the surface of the post 44. The flutes are similar to the vertical parallel grooves formed on a classical architectural column. The grooves may be pointed or rounded at their intersection. The flutes 54 extend outwardly from and vertically around the post 44. In one embodiment, the flutes form a plurality of parallel grooves or passageways 55 through which the coolant is directed as it passes downwardly over the surface of the post 44. The flutes 54 and passageways 55 extend the length of the post 44 and parallel to the longitudinal axis thereof. As seen in FIG. 4, the top of the flutes 54 are bevelled at the point where they meet the top of post 44.

The post 44 is machined by broaching, milling, knurling and the like to form a desired configuration of radially extending surfaces on the post to promote cooling of the post. This is accomplished by increasing the surface area of the post in contact with the circulating coolant. The flutes, in one embodiment, extend vertically substantially the entire length of the post and are bevelled at the top of the post. The flutes 54, as seen in FIG. 4, have a preselected thickness and are spaced a preselected distance apart to form a plurality of longitudinally extending passageways 55 on the exterior of the post positioned radially around the post 44. With this configuration, the outer surface area of the post 44 is substantially increased to promote the transfer of heat from the electrode element 22 by increasing the surface area of the post in heat transfer relationship with the coolant.

Preferably, the expanded surface area of the post 44 extends the entire length of the post to the bottom wall 42. The flutes 54 on the post extend in a direction parallel to the flow of coolant through the annulus 48 in the direction of the arrow 50. As the coolant flows downwardly through the inner tube 32 it enters the annulus 48 around the post 44. The cross sectional area of the annulus 48 is substantial less than the cross sectional area of the passageway of the tube 32 above the post 44. Consequently, the annulus 48 constricts the coolant flow as it flows past the post 44 and around the lower end of the tube 32 and upwardly around the tube 32 in the passageway 40. It is believed that the constricted opening around the post 44 formed by the annulus 48 creates a venturi effect around the post 44 to accelerate the flow of coolant past the post 44. The accelerated flow rate is enhanced by the longitudinal flutes 54 and passageways 55 which extend in a direction on the surface of the post parallel to the direction of flow of the coolant over the surface of the post. This feature further promotes the rate of heat transfer from the post 44 to the coolant.

In cutting tests conducted with the electrode assembly of the present invention, the performance of a plasma arc torch using the electrode assembly 18 was compared with the performance of a plasma arc torch using a conventional electrode assembly. The conventional electrode assembly included an electrode with a cooling tube surrounding a post. However, the post had a smooth outer cylindrical surface as distinguished from the fluted cylindrical surface of the post of the present invention.

Tests were conducted under the same operating conditions for each torch. The torch model, operating current, gas composition, flow rate, coolant, type and thickness of metal, and the nature of the cut were the same for both torches. Piercings of the metal were conducted until the electrode failed or was considered worn out by the operator. Overall, the electrode assembly having a post with a vertical fluted surface provided about 40% more piercings until failure of the electrode occurred as compared with a conventional electrode assembly having a post with a smooth cylindrical outer surface. In one example, the electrode assembly with a vertical fluted post experienced 261 pierces before it failed. A conventional electrode assembly made 186 pierces before failure. Based on the results of the piercing tests, it was concluded the electrode assembly with a vertically fluted post had a substantially longer operating life than a conventional electrode assembly with a post having a smooth cylindrical outer surface. Other tests were conducted where the external surface had a threaded portion where the grooves or recessed portions extended substantially perpendicular to the longitudinal axis of the post. The other operating conditions were the same, and it was found that the electrodes were considered worn out or failed after between about 50 and 100 piercings. This again, is substantially less than the number of piercings where the outer surface of the post had vertical flutes.

Figure 7:
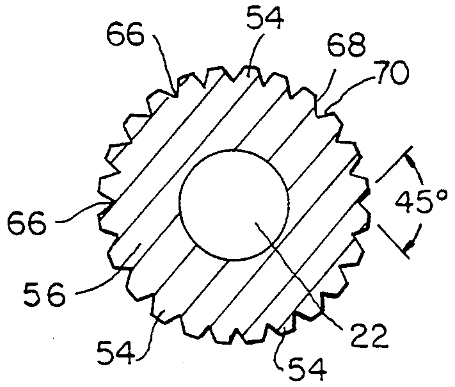
FIG. 7 is a sectional view of the electrode taken along line VII—VII of FIG. 5, illustrating the fluted exterior surface of the post.
Figure 6:
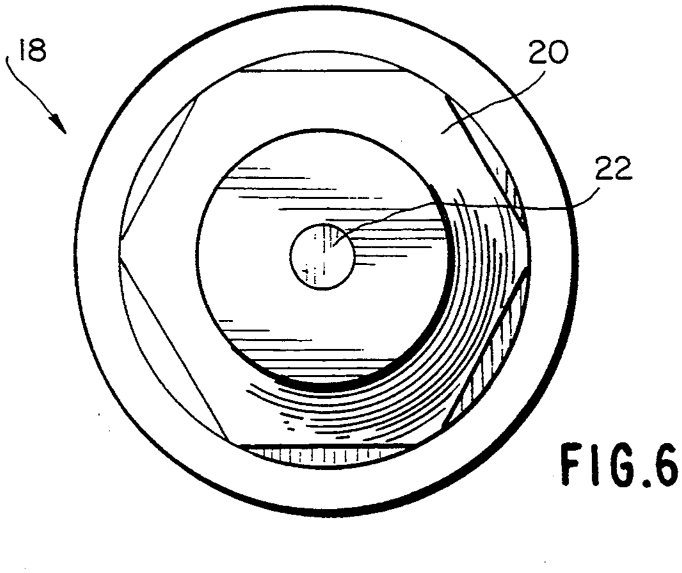
FIG. 6 is an end view of the electrode shown in FIG. 5 taken along the line VI—VI of FIG. 5.

Now referring to FIGS. 5–7, there is illustrated another embodiment of the electrode assembly 18 of the present invention in which like numerals identified and described above for FIGS. 1–4 designate like elements in FIGS. 5–7. The electrode assembly 18 illustrated in FIG. 5 is shown with the cooling tube removed from the interior passageway 40. The electrode assembly 18 includes a post 56 having a cylindrical body portion 58 extending up from the bottom wall 42. The upper end portion of the post 56 has a frusto-conical end portion 60 with a smooth inclined side wall 62. The side wall 62 extends from a horizontal end portion 64 to the vertical side wall of the post 56. The vertical side wall as shown in FIG. 7 is cylindrical having a plurality of parallel grooves 66 formed by a suitable machining operation in the vertical side wall of the post 56.

The vertical grooves 66 extend upwardly from the bottom wall 42 to the inclined side wall 62. The vertical grooves 66 are positioned parallel to one another and extend radially around the entire circumference of the post 56. Each groove is formed by a pair of side walls 68 and 70 that intersect at an angle. In one embodiment, the side walls 68 and 70 form a 45° angle as shown in FIG. 7. The formation of the grooves on the surface of the cylindrical post 56 substantially increases the exterior surface of the post in comparison with a post having a smooth cylindrical surface. By increasing the surface area of the post with the grooves, the transfer of heat from the electrode element through the post to the coolant is substantially increased to the extent that the operational life of the electrode assembly 18 is extended.

Thus, with the shaped surface of the post 44, transfer of heat from the electrode element 22 to the coolant circulating around the post 44 is promoted. Deterioration of the electrode element 22 due to exposure to the high temperature of the plasma arc is sufficiently resisted to extend the operational life of the electrode assembly 18.

Another series of tests were run with the electrode having the vertical flutes. These tests were performed under actual working conditions, where the same dimensional piece with the same configuration was cut from the metal plate. The operating conditions for the fluted post and the fluted post electrode and the smooth post electrode were substantially the same. The piece cut from the plate had a closed generally elliptical configuration, so that parallel piercings and cut were required to make the piece of the desired configuration. Five electrodes having the fluted external surface were substituted for the conventional electrodes having the smooth outer cylindrical surface during one shift and traction pieces were cut from the metal plates with the modified electrodes. The modified fluted electrodes herein described pierced 96, 100, 100, 100, and 80 pieces respectively before they were considered worn out and were replaced. The electrodes of this invention, thus averaged about 95 pieces before they worn out and were replaced. The conventional electrodes with the smooth cylindrical post, on the other hand, pierced between 35 to 65 pieces before wearing out and averaged about 50 pieces per electrode through an entire shift. The electrodes of the present invention are more efficient and provide longer periods of operating time per shift when compared with conventional electrodes having the smooth outer surface. It is believed that the configuration of the outside of the post contributes substantially to this increase in efficiency.

According to the provisions of the patent states, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. An electrode assembly for a plasma arc torch comprising, an electrode holder having a tubular body portion with an exterior surface and an interior surface, said interior surface having an open upper end portion and a closed lower end portion forming a bottom wall, said interior surface being exposed to a coolant flowing between said open upper end portion and said closed lower end portion, a post projecting upwardly from said bottom wall concentrically within said tubular body portion, said post having an outer surface forming an annulus between said interior surface and said post adjacent to said bottom wall, said post having a bore with an opening extending through said exterior surface, an electrode element retained in said post bore, said electrode element having an arc initiating end portion positioned in said opening in said exterior surface, and said post further comprising means, disposed on said outer surface thereof, for increasing an outer surface area of said post to in turn increase the area of contact of the coolant with said outer surface of said post, thereby to increase the rate of heat transfer from said electrode element through said post to the coolant.

2. An electrode assembly for a plasma arc torch as set forth in claim 1, wherein said post has a longitudinal axis, and said means for increasing the outer surface area is positioned on said post outer surface parallel to said longitudinal axis for directing the flow of coolant in contact with said post.

3. An electrode assembly for a plasma arc torch as set forth in claim 2 in which, said means for increasing the outer surface area includes a plurality of longitudinal surfaces positioned parallel to said post longitudinal axis and extending around said post.

4. An electrode assembly for a plasma arc torch as set forth in claim 2 in which, said means for increasing the outer surface area comprises a fluted outer surface.

5. An electrode assembly for a plasma arc torch as set forth in claim 1 in which, said means for increasing the outer surface area extends on said post outer surface in a direction parallel to the flow of coolant through said electrode holder tubular body portion.

6. An electrode assembly for a plasma arc torch as set forth in claim 1, wherein said means for increasing the outer surface area comprises:

longitudinally extending grooves positioned on said post outer surface, said grooves extending on said outer surface the length of said post and around the circumference of said post.

7. An electrode assembly for a plasma arc torch as set forth in claim 6 in which, said grooves are spaced a preselected distance apart to form a plurality of longitudinally extending protrusions separated by said grooves on said post outer wall.

8. An electrode assembly for a plasma arc torch as set forth in claim 1 in which, said bore extends through said post from said interior surface to said exterior surface of said electrode holder tubular body portion, and said electrode element retained in said bore with one end portion in fluid communication with said interior surface and an opposite end portion positioned in fluid communication with said exterior surface.

9. A method for cooling an electrode assembly of a plasma arc torch comprising the steps of, providing an electrode holder with a tubular body portion having an interior surface with an open upper end portion and a closed bottom wall, circulating a coolant in contact with the interior surface of the electrode holder, projecting a post upwardly from the bottom wall within said tubular body portion, forming an annulus around the post between the interior surface of the electrode holder and the surface of the post, retaining an electrode element within a bore of the post, positioning the end of the electrode element at the exterior surface of the electrode holder to initiate an electric arc, and increasing the surface area of the post to be greater than the surface area of a virtual right circular cylinder having a smooth cylindrical surface and corresponding in dimension to the post to increase the area of contact of the coolant with the outer surface of the post thereby to increase the rate of heat transfer from the electrode element through the post to the coolant.

10. A method as set forth in claim 9 which includes, extending the surface of the post around the post to form longitudinal passageways the length of the post, directing a flow of coolant through the annulus into contact with the surface of the post and through the passageways on the surface of the post, and transferring heat from the electrode element through the post to the coolant flowing through the passageways.

11. A method as set forth in claim 10 which includes, positioning an inner tube within the body portion of the electrode holder, extending a lower end portion of the tube into the annulus between the post and the interior surface of the electrode holder to a position spaced above the bottom wall, and directing the flow of the coolant downwardly through the inner tube and through the passageways into intimate contact with the surface of the post.

12. A method as set forth in claim 11 which includes, passing the flow of coolant into contact with the surface of the post and through the passageways into contact with the bottom wall of the electrode holder, and directing the flow of coolant from the bottom wall surrounding the post around the lower end of the inner tube and upwardly through the electrode holder between the interior surface thereof and the inner tube.

13. A method as set forth in claim 9 which includes, machining the exterior surface of the post to form flutes extending vertically on the post around the surface of the post, spacing the flutes one from another to form passageways positioned between the flutes and extending the length of the post, and directing a flow of coolant over the surface of the post to pass in contact with the flutes and through the passageways to promote the transfer of heat from the post to the coolant.

14. A method as set forth in claim 9 which includes, extending the bore through the post, frictionally retaining the electrode element in the bore, and circulating the coolant in contact with the electrode element in the post to transfer heat from electrode element to the coolant to reduce the temperature of the electrode element from an elevated temperature.

15. A method as set forth in claim 9 which includes, forming protrusions on the surface of the post to increase the surface area of the post in heat transfer relationship with the coolant circulating within the electrode holder, and directing by the protrusions on the surface of the post the flow of coolant along the length of the post to increase the transfer of heat from the electrode element through the post to the coolant.

16. An electrode assembly for a plasma arc torch comprising, an electrode holder having a tubular body portion with an exterior surface and an interior surface, said interior surface having an open upper end portion and a closed lower end portion forming a bottom wall, said interior surface being exposed to a coolant flowing between said open upper end portion and said closed lower end portion, a generally cylindrical post projecting upwardly from said bottom wall concentrically within said tubular body portion, said post having an outer surface forming an annulus between said interior surface and said post adjacent to said bottom wall, said post having a bore with an opening extending through said exterior surface, an electrode element retained in said post bore, said electrode element having an arc initiating end portion positioned in said opening in said exterior surface, and said post having a plurality of longitudinally extending grooves formed in said outer surface thereof, said grooves being spaced a preselected distance apart to form a plurality of longitudinally extending protrusions separated by said grooves to increase the area of contact of the coolant with said outer surface of said post, thereby to increase the rate of heat transfer from said electrode element through said post to the coolant.

17. An electrode assembly for a plasma arc torch as set forth in claim 16, wherein said grooves extend substantially an entire length of said post and around the circumference thereof.

* * * * *